No. 803,006. PATENTED OCT. 31, 1905.
J. B. MERIAM.
FLEXIBLE COUPLING.
APPLICATION FILED MAR. 6, 1905.

Witnesses.
E. B. Gilchrist
J. Stolee

Inventor
Joseph B. Meriam,
By his Attorneys,
Thurston & Bates

UNITED STATES PATENT OFFICE.

JOSEPH B. MERIAM, OF CLEVELAND, OHIO, ASSIGNOR TO THE BRUCE-MERIAM-ABBOTT COMPANY, OF CLEVELAND, OHIO, A CORPORATION.

FLEXIBLE COUPLING.

No. 803,006.      Specification of Letters Patent.      Patented Oct. 31, 1905.

Application filed March 6, 1905. Serial No. 248,385.

*To all whom it may concern:*

Be it known that I, JOSEPH B. MERIAM, a citizen of the United States, residing at Cleveland, in the county of Cuyahoga and State of Ohio, have invented a certain new and useful Improvement in Flexible Couplings, of which the following is a full, clear, and exact description, reference being had to the accompanying drawings.

The object of this invention is to provide a very simple and efficient flexible coupling for connecting a driving-shaft with a driven shaft. The flexibility of the coupling allows the shafts to run smoothly even though they may not be in perfect alinement and reduces the jar in starting or stopping.

The invention consists of a series of flexible links arranged around the axis of rotation, each link being connected at one point to the driving member and at another to the driven member.

The invention consists also of the construction and combination of parts hereinafter more fully described, and definitely set out in the claims.

Figure 1:
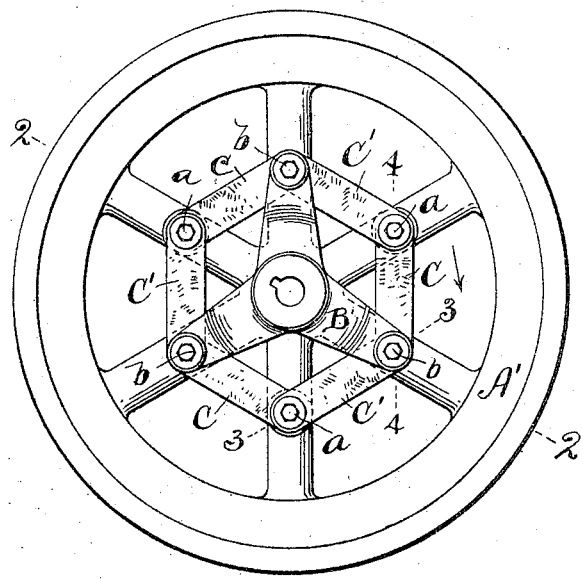
Figure 2:
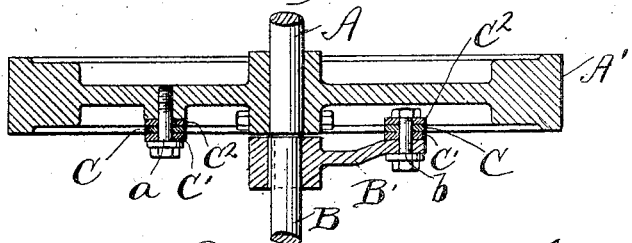
Figure 3:
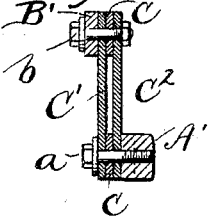
Figure 4:
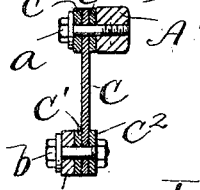

In the drawings, Figure 1 is a side elevation of my invention applied to the fly-wheel of a driving-shaft and a spider on the driven shaft. Fig. 2 is a cross-section of the same on line 2 2 of Fig. 1. Figs. 3 and 4 are cross-sections through the links on the correspondingly-numbered lines of Fig. 1.

In the drawings, A indicates the driving-shaft, and B the driven shaft. A' is a fly-wheel secured to the driving-shaft, and B' is a spider keyed to the driven shaft. The shafts A and B are more or less nearly in alinement, but may be considerably out, owing to the flexibility of my coupling, now to be described.

Connecting the spider B' and the fly-wheel A' are a series of flat leather links C and C'. Each of these links is secured at one end to the spider and at the other to the fly-wheel. In the embodiment shown in the drawings there are six links placed in a circuit, and thus forming a hollow hexagon. At three of the salient angles of this hexagon it is secured to the spider and at the other three to the spokes of the fly-wheel. This is accomplished by securing each of the links at one end to one of the bolts $b$ carried by the spider and at the other end to one of the bolts $a$, carried by the fly-wheel. There are thus secured to each bolt links leading in two directions.

Alternate legs of the polygon of links I make of one more link than the other legs. This allows the links to tenon in between each other at the points of securement. In the embodiment shown in the drawings three of the legs of the hexagon are made of two links each, the other three being a single link each, whose end takes between the two. This clearly appears from an inspection of Figs. 3 and 4, where the ends of the links C take between the ends of the links C' and the links $C^2$, which latter are exactly behind the links C', and hence are not seen in Fig. 1.

The arrangement shown in the drawings of a course of six links alternately doubled is to be taken as illustrative of any convenient number of links in the course and of any convenient number behind each other. The number of links in the course should, however, be an even number, and it is convenient that consecutive legs of the course have their number of links alternately increased or decreased by one.

The double links C' and $C^2$ are so placed that they are under tension during the driving, while the single link C is idle during the driving, but operates to hold back the driven member during a decrease of speed of the driving member. For this latter purpose not so much strength is required as for the link which communicates the driving movement.

Having described my invention, I claim—

1. In a flexible coupling, in combination, a driving member, a driven member, a series of flat leather links placed in a circuit with overlapping ends, bolts passing through alternate ones of such overlapped ends into the driving member, and bolts passing through the remaining ones of such overlapped ends into the driven member.

2. In a flexible coupling, in combination a driving-shaft, a wheel thereon having spokes, a driven shaft, a spider thereon, a series of flat leather links placed on edge in a circuit around the axis of rotation between the spider and the wheel, said links having their ends overlapping, and means for securing alternate ones of said overlapped ends to the spokes of the wheel and the remaining ones of said overlapped ends to the arms of said spider.

3. In a flexible coupling, in combination, a driving member, a driven member, and a series of flexible links which are alternately connected to the driving member and driven member, there being an increased number of links at alternate positions around the circuit.

4. In a flexible coupling, in combination, a driving member, a driven member, and a series of flexible links between said members, having their ends overlapping to form a polygon about the axis of rotation, alternate legs of said polygon having one more link than intermediate legs whereby the links tenon between each other, said polygon being secured at its angles alternately to the driving and driven members.

5. In a flexible coupling, in combination, a driving-shaft, a wheel thereon, a driven shaft, a spider secured to the driven shaft, three leather links secured to each arm of the spider and extending in different directions, the free end of the intermediate link taking between the free ends of the outside links of the next arm of the spider and such free ends being secured by a single bolt to said wheel.

In testimony whereof I hereunto affix my signature in the presence of two witnesses.

JOSEPH B. MERIAM.

Witnesses:
M. S. KETCHUM,
W. C. BRUCE.